(12) United States Patent
Akiyama (10) Patent No.: US 8,175,048 B2
(45) Date of Patent: May 8, 2012

(54) MULTI-HOP WIRELESS COMMUNICATION SYSTEM

(75) Inventor: Hiroyuki Akiyama, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 647 days.

(21) Appl. No.: 12/354,031

(22) Filed: Jan. 15, 2009

(65) Prior Publication Data

US 2009/0190542 A1 Jul. 30, 2009

(30) Foreign Application Priority Data

Jan. 30, 2008 (JP) .................................. 2008-019264

(51) Int. Cl.
 *H04W 4/00* (2009.01)

(52) U.S. Cl. .................................................... 370/329

(58) Field of Classification Search .................. 370/203, 370/204–215, 229–240, 241–253, 310–337, 370/338–350, 395.1, 395.3, 395.4, 395.41, 370/395.42, 395.5, 395.52, 395.53, 412–421, 370/431–457, 458–463, 464–497, 498–522, 370/523–520, 521–529
See application file for complete search history.

(56) References Cited

U.S. PATENT DOCUMENTS

| | | | | |
|---|---|---|---|---|
| 7,957,356 | B2 * | 6/2011 | Wang et al. | 370/338 |
| 2005/0102443 | A1 * | 5/2005 | Mahany et al. | 710/18 |
| 2006/0013177 | A1 * | 1/2006 | Saito | 370/338 |
| 2006/0128349 | A1 * | 6/2006 | Yoon | 455/343.2 |
| 2006/0268908 | A1 * | 11/2006 | Wang et al. | 370/401 |
| 2007/0025364 | A1 * | 2/2007 | Kodialam et al. | 370/400 |
| 2007/0104215 | A1 * | 5/2007 | Wang et al. | 370/458 |
| 2007/0280188 | A1 * | 12/2007 | Kang et al. | 370/338 |
| 2008/0101275 | A1 * | 5/2008 | Kang et al. | 370/315 |
| 2008/0165761 | A1 * | 7/2008 | Goppner et al. | 370/350 |
| 2008/0232334 | A1 * | 9/2008 | Das et al. | 370/337 |
| 2011/0064072 | A1 * | 3/2011 | Wang et al. | 370/350 |

FOREIGN PATENT DOCUMENTS

| | | |
|---|---|---|
| JP | 2005-354634 | 12/2005 |
| JP | 2007-116408 | 5/2007 |

* cited by examiner

*Primary Examiner* — Kwang B Yao
*Assistant Examiner* — Jung-Jen Liu
(74) *Attorney, Agent, or Firm* — Studebaker & Brackett PC; Donald R. Studebaker (57) ABSTRACT

A multi-hop wireless communication system which synchronizes a time signal generated by a timer device included in each of the wireless terminals and sets a different active timing to a wireless terminal connected to each of a plurality of multi-hop routes. The wireless terminal monitors the time signal of the timer device included in the wireless terminal and activates wireless communication of the wireless terminal when it is detected that the time signal matches an active timing set in the wireless terminal.

7 Claims, 12 Drawing Sheets

ROUTE TABLE 54

| ROUTE NUMBER (n) | NUMBER OF TERMINALS (N) IN ROUTE | TERMINALS IN ROTE | ACTIVE TIMING PERIOD (ACT-P) | ACTIVE TIMING (ACT-Tn) | ACTIVE DURATION (ACT-Cn) |
|---|---|---|---|---|---|
| 1 | 3 | 11, 12, 13 | 400 | 100 | 100 |
| 2 | 3 | 21, 22, 23 | 400 | 200 | 100 |
| 3 | 4 | 31, 32, 33, 34 | 400 | 300 | 100 |
| 4 | 3 | 41, 42, 43 | 400 | 400 | 100 |
| 5 | ... | ... | ... | ... | ... |
| 6 | ... | ... | ... | ... | ... |

ROUTE TABLE 54

| ROUTE NUMBER (n) | NUMBER OF TERMINALS (N) IN ROUTE | TERMINALS IN ROTE | ACTIVE TIMING PERIOD (ACT-P) | ACTIVE TIMING (ACT-Tn) | ACTIVE DURATION (ACT-Cn) |
|---|---|---|---|---|---|
| 1 | 5 | 11, 12, 13, 142, 151 | 300 | 0 | 100 |
| 2 | 5 | 11, 12, 13, 142, 152 | 300 | 100 | 100 |
| 3 | 4 | 11, 12, 13, 141 | 300 | 200 | 100 |
| 4 | ... | ... | ... | ... | ... |
| 5 | ... | ... | ... | ... | ... |
| 6 | ... | ... | ... | ... | ... |

MULTI-HOP WIRELESS COMMUNICATION SYSTEM

BACKGROUND OF THE INVENTION

1. Field of the Invention

The present invention relates to a multi-hop wireless communication system including a plurality of wireless terminals that performs multi-hop communication with a wireless base station.

2. Description of the Related Art

In a multi-hop wireless communication system, a wireless signal generated by one wireless terminal is normally transmitted to a wireless base station through another wireless terminal in a multi-hop fashion although the wireless signal may also be transmitted directly to the wireless base station. A sensor network as a typical example application of the multi-hop wireless communication system requires that the cost is reduced using small batteries since a number of wireless terminals need to be installed. The sensor network also requires that power consumption is reduced to allow sensing data to be repeatedly reported to the base station over a long period of time. From the viewpoint of maintenance, the sensor network also requires low power consumption to eliminate the need to replace batteries frequently over a long period.

Japanese Patent Application Publication No. 2005-354634 discloses a technique which achieves low power consumption by allowing each wireless terminal that performs multi-hop wireless communication to activate its own wireless transmitter/receiver only when a wireless signal addressed to an ID thereof is received.

Japanese Patent Application Publication No. 2007-116408 discloses a technique which achieves low power consumption by synchronizing a multi-hop wireless communication network to allow each wireless module to be turned off except when the wireless module is waiting to receive signals or is receiving or transmitting signals.

Figure 1:
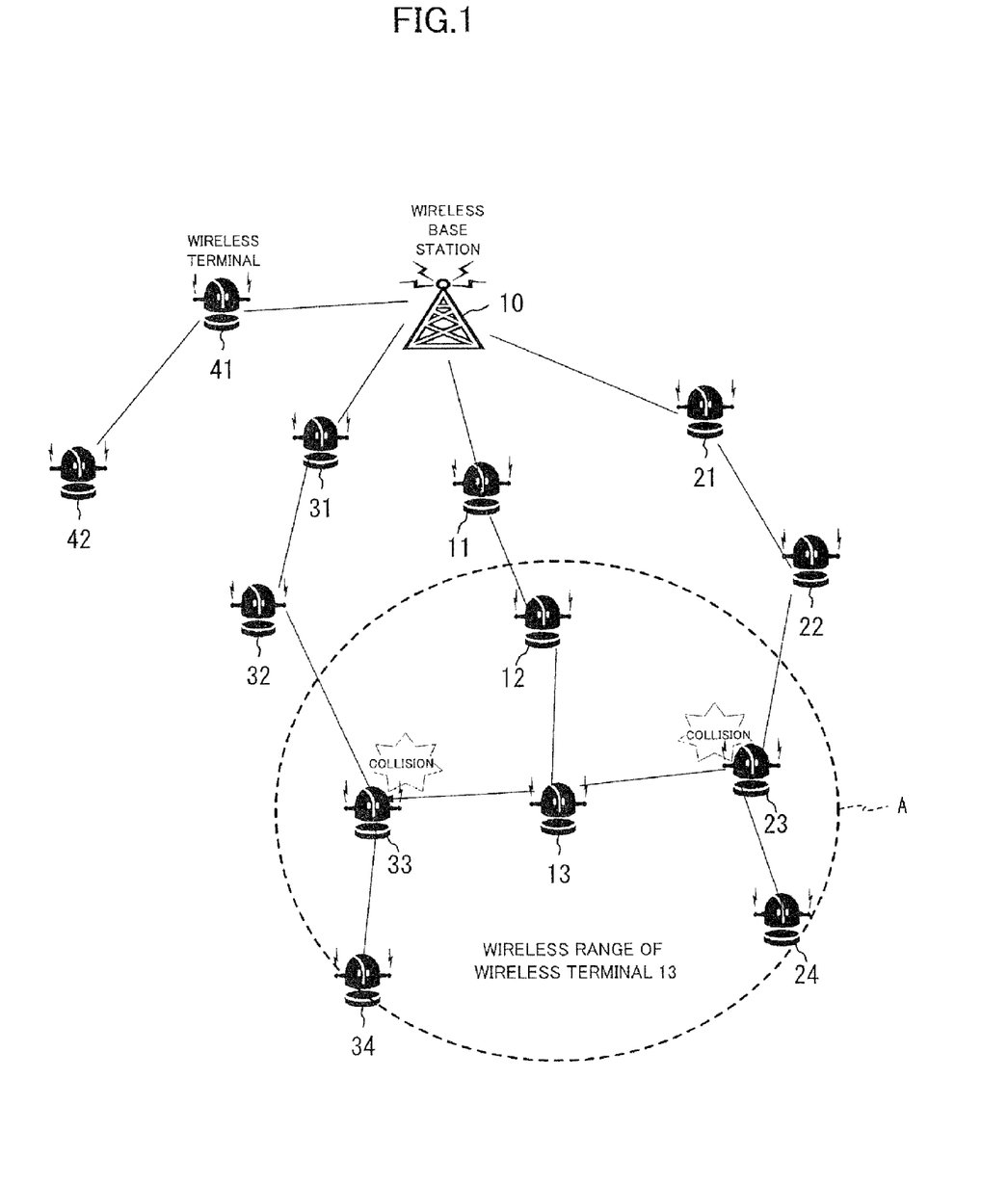
FIG. 1 is a block diagram illustrating a conventional multi-hop wireless communication system.

However, when such an intermittent operation method as the above conventional technologies is employed, a number of wireless terminals in the network may collectively shift from an inactive state to an active state at the same time to start transmitting wireless signals, as shown in FIG. 1. This causes problems in that wireless signals of adjacent wireless terminals collide with each other and idle waiting time occurs, thereby hindering efficient communication. For example, in the configuration described in Japanese Patent Application Publication No. 2005-354634 (see a description of paragraph [0039] and FIG. 4), a multi-hop route to which wireless terminals 34 and 36 belong is activated at a certain time during a period for which a multi-hop route to which wireless terminals 33 and 35 belong is activated. As a result, there is a possibility that wireless signals of the wireless terminals 33 and 34 will collide, thereby hindering efficient communication. In addition, in the configuration described in the Japanese Patent Application Publication No. 2007-116408, it is not possible to avoid collision of wireless signals of wireless terminals in different multi-hop routes although low power consumption is achieved.

SUMMARY OF THE INVENTION

Therefore, the invention has been made in view of the above problems, and it is an object of the invention to provide a multi-hop wireless communication system and a wireless communication method that each achieve low power consumption of wireless terminals in the multi-hop wireless communication system while achieving efficient communication.

A multi-hop wireless communication system is a system including a wireless base station and a plurality of wireless terminals, each of the wireless terminals performing wireless communication through a multi-hop route formed directly or through at least one other wireless terminal with the wireless base station, the multi-hop wireless communication system comprising: a time signal synchronizer which synchronizes a time signal generated by a timer device included in each of the wireless terminals; and an active timing setting unit which sets a different active timing for each multi-hop route to wireless terminals located on each multi-hop route, wherein each of the wireless terminals monitors the time signal of the timer device included in the wireless terminal and activates wireless communication of the wireless terminal when it is detected that the time signal matches an active timing set in the wireless terminal.

A wireless communication method in the invention is a method in a multi-hop wireless communication system including a wireless base station and a plurality of wireless terminals, each of the wireless terminals performing wireless communication through a multi-hop route formed directly or through at least one other wireless terminal with the wireless base station, the wireless communication system comprising the steps of: synchronizing a time signal generated by a timer device included in each of the wireless terminals; and setting a different active timing for each multi-hop route to wireless terminals located on each multi-hop route; monitoring the time signal of the timer device in each of the wireless terminals; and activating wireless communication of the wireless terminal when it is detected that the time signal matches an active timing set in each of the wireless terminal.

The multi-hop wireless communication system and method according to the invention achieve low power consumption of wireless terminals in the multi-hop wireless communication system while achieving efficient communication.

DETAILED DESCRIPTION OF THE INVENTION

Embodiments of the invention will now be described in detail with reference to the accompanying drawings.

First Embodiment

Figure 2:
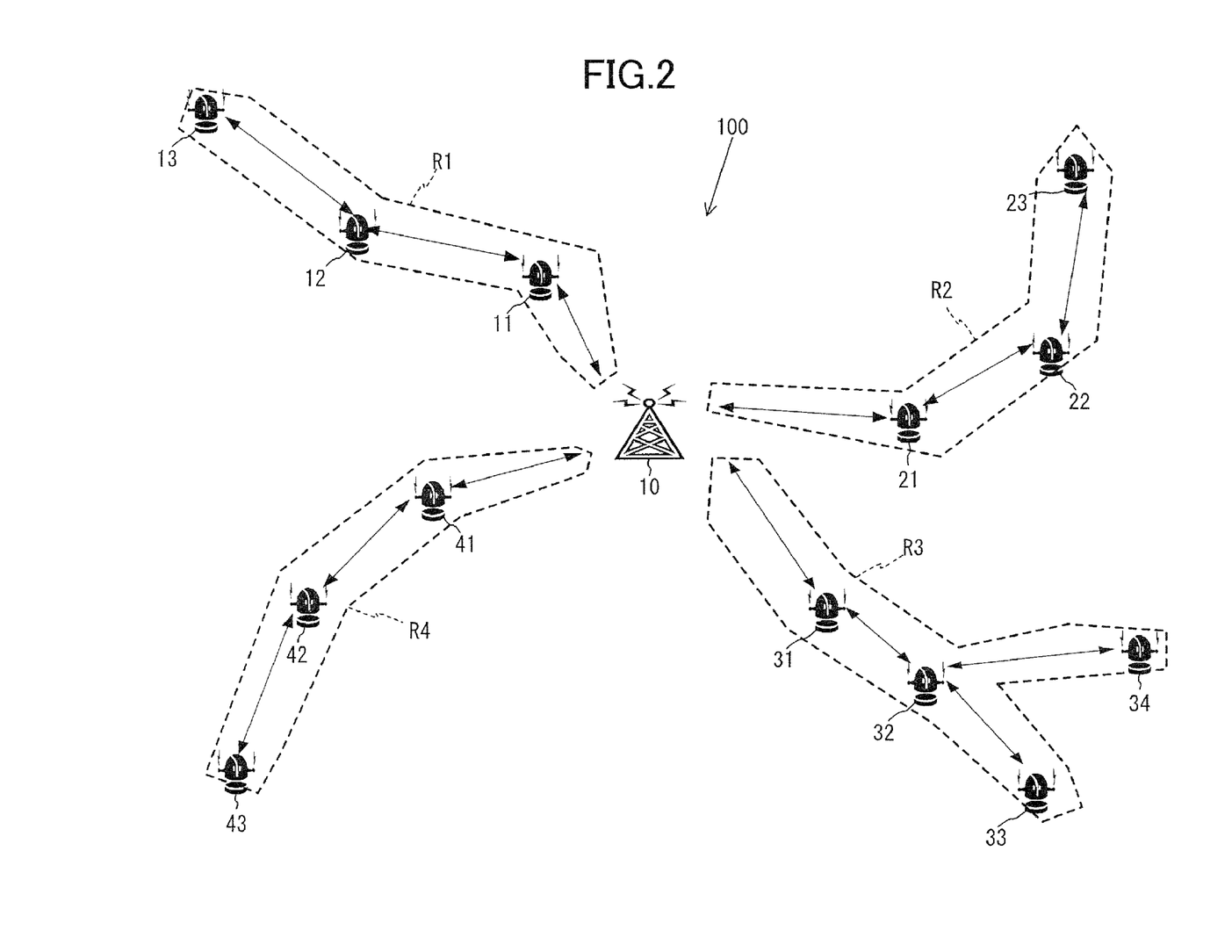
FIG. 2 is a block diagram illustrating an overall configuration of a multi-hop wireless communication system according to a first embodiment of the invention.

FIG. 2 illustrates an overall configuration of a multi-hop wireless communication system 100 according to a first embodiment. Four multi-hop routes R1, R2, R3, and R4 are formed, starting from a wireless base station 10 as a branch point. In the multi-hop route R1, a wireless terminal 11, a wireless terminal 12, and a wireless terminal 13 are connected linearly through a wireless path. In the multi-hop route R2, a wireless terminal 21, a wireless terminal 22, and a wireless terminal 23 are connected linearly through a wireless path. In the multi-hop route R3, a wireless terminal 31, a wireless terminal 32, a wireless terminal 33, and a wireless terminal 34 are connected linearly through a wireless path. In the multi-hop route R4, a wireless terminal 41, a wireless terminal 42, and a wireless terminal 43 are connected linearly through a wireless path. The number of the multi-hop routes is equal to the number of wireless terminals (4 wireless terminals 11, 21, 31, and 41 in this embodiment) which can communicate directly with the wireless base station 10. Identification and setting of wireless terminals connected to each of the multi-hop routes R1 to R4 may be manually performed at the wireless base station 10 or may be automatically performed as the wireless base station 10 performs negotiation with each wireless terminal using a technology specified in "IEEE 802.11s Draft Standard", "RFC3565 AODV", or "RFC3626 OLSR".

Each of the wireless terminals 11 to 13, the wireless terminals 21 to 23, the wireless terminals 31 to 34, and the wireless terminals 41 to 43 has the same basic functions. For example, each wireless terminal collects sensor data such as temperature or humidity and transmits the sensor data to the wireless base station 10 in a multi-hop fashion. The wireless base station 10 manages the entirety of the multi-hop wireless communication system 100 and collects data transmitted from each wireless terminal.

Figure 3:
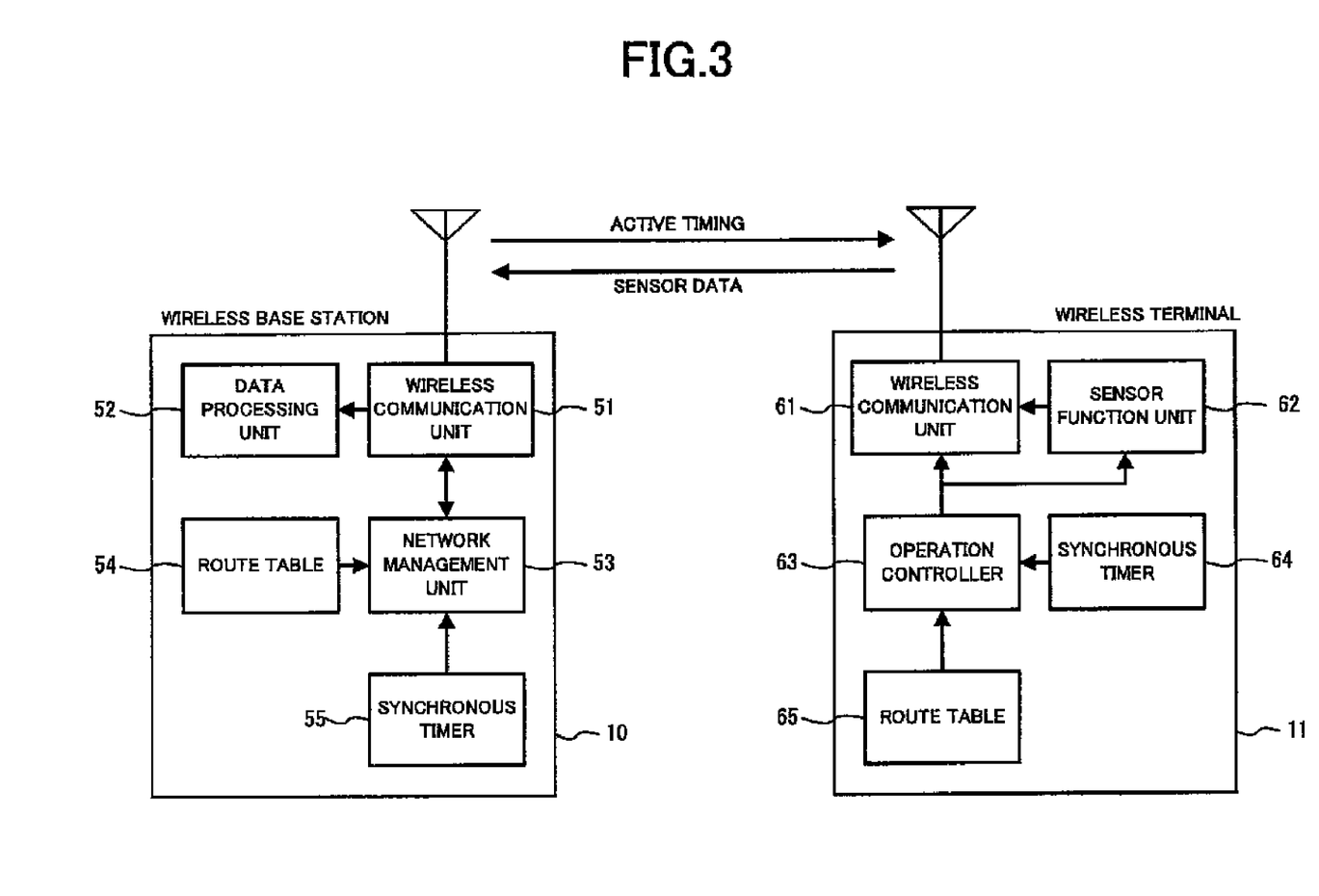
FIG. 3 is a block diagram illustrating an internal configuration of the wireless base station and the wireless terminal.

FIG. 3 illustrates an internal configuration of the wireless base station and the wireless terminal. Here, the wireless terminal 11 represents the plurality of wireless terminals illustrated in FIG. 2. The wireless terminal 11 includes a wireless communication unit 61, a sensor function unit 62, an operation controller 63, a synchronous timer 64, and a route table 65. The wireless communication unit 61 has a function to transmit sensor data such as temperature or humidity to the wireless base station 10 and a function to receive an active timing or an active duration reported by the wireless base station 10. The wireless communication unit 61 also has a function to implement multi-hop to transmit sensor data transmitted from another wireless terminal toward the wireless base station 10 or to transmit an active timing reported by the wireless base station 10 toward a destination wireless terminal. The sensor function unit 62 has a function to obtain sensor data as a main function of the wireless terminal.

The operation controller 63 has a function to set its own multi-hop route in the route table 65 in response to an instruction from the wireless base station 10 or through negotiation with the wireless base station 10 and a function to control the mode of multi-hop communication of the wireless communication unit 61 according to the content of the route table 65. The operation controller 63 also has functions to monitor a time signal generated by the synchronous timer 64 and to control the operation state of its own wireless terminal to shift from an inactive state to an active state when it is detected that a time represented by the time signal matches an active timing set in or reported to the operation controller 63. When the operation controller 63 controls the operation state of the wireless terminal to be activated, the wireless terminal initiates transmission of sensor data and continues transmission during the active duration. When the operation controller 63 controls the operation state of the wireless terminal to be deactivated, the wireless terminal stops transmission of sensor data and enters a waiting state.

The wireless base station 10 includes a wireless communication unit 51, a data processing unit 52, a network management unit 53, a route table 54, and a synchronous timer 55. The wireless communication unit 51 has a function to transmit an active timing and an active duration to each wireless terminal in a multi-hop fashion and a function to receive sensor data from each wireless terminal in a multi-hop fashion. The data processing unit 52 has a function to perform a data process such as a storage process or a statistic process on sensor data received from each wireless terminal. The network management unit 53 has functions to synchronize times indicated by time signals of synchronous timers of all wireless terminals included in the multi-hop wireless communication system 100 and to set the synchronized time as a common synchronous time (SYNC-T) and a function to set an active timing and an active duration of each wireless terminal connected to each multi-hop route according to the setting content of the route table 54.

The network management unit 53 may also include means for setting a multi-hop route, as a wireless terminal enters or exits the multi-hop wireless communication system 100, assigning a multi-hop route number to each multi-hop route and calculating an active timing of each multi-hop route, and automatically setting the calculated active timing in the route table 54.

All time signals of the multi-hop wireless communication system 100 are synchronized through use of the synchronous timer 55 included in the wireless base station 10 and the synchronous timer 64 included in the wireless terminal 11. Such synchronization may be implemented using a Timing Synchronization Function (TSF) that uses a timestamp in a beacon frame described in "ANSI/IEEE Std 802.11, 1999 Edition Wireless LAN Medium Access Control (MAC) and Physical Layer (PHY) Specifications (IEEE 802.11)".

Figure 4:
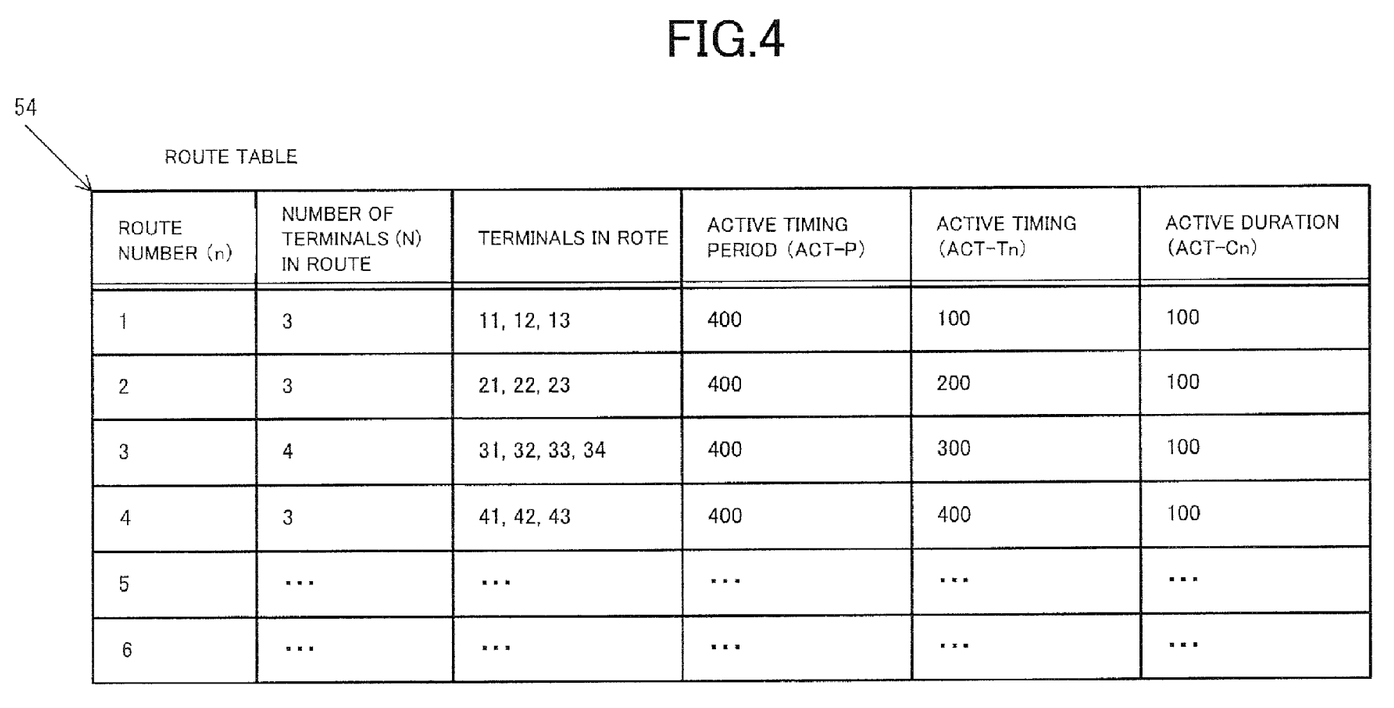
FIG. 4 is a diagram illustrating an example configuration of a route table illustrated in FIG. 3.

FIG. 4 illustrates an example configuration of the route table illustrated in FIG. 3. For each multi-hop route, the number of terminals in the route (N), IDs of terminals in the route, an active timing period (ACT-P), an active timing (ACT-T), and an active duration (ACT-C) are set in the route table 54. For example, if the multi-hop route number of the multi-hop route R1 is "1", the number of terminals in the route (N=3), IDs of terminals in the route (11, 12, and 13), an active timing period (ACT-P=400), an active timing (ACT-T=100), and an active duration (ACT-C=100) are set for the multi-hop route R1 in the route table 54.

Figure 5:
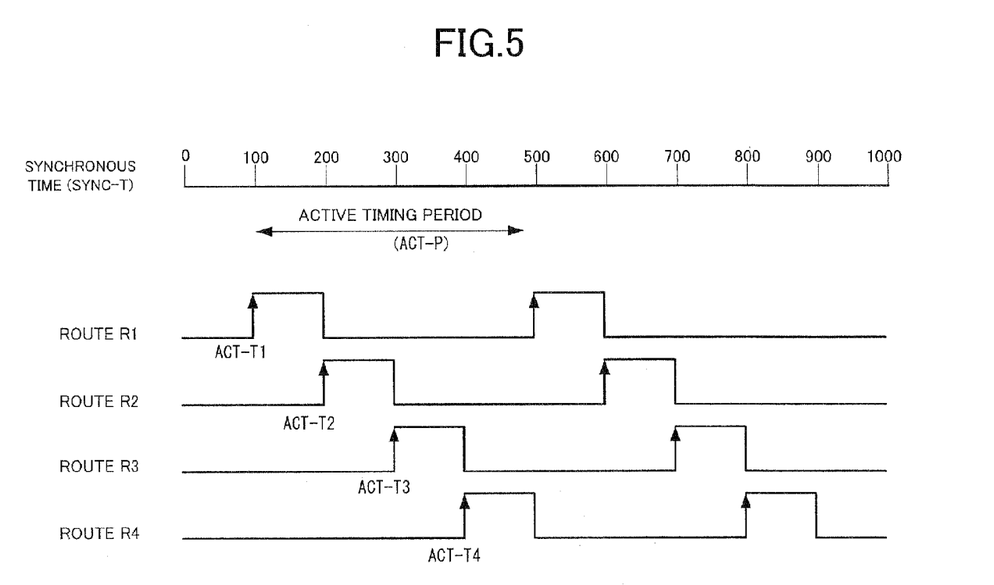
FIG. 5 is a chart illustrating example active timings according to the content of the route table illustrated in FIG. 4.

FIG. 5 illustrates example active timings according to the content of the route table illustrated in FIG. 4. Here, the horizontal axis represents the synchronous time (SYNC-T). The vertical axis represents respective active timings of the multi-hop routes R1, R2, R3, and R4 using arrows "↑". For example, in the case of the multi-hop route R1, all wireless terminals 11 to 13 of the multi-hop route R1 (see FIG. 2)

simultaneously shift from an inactive state to an active state at time "ACT-T1" on the synchronous time axis.

One method for determining the active timing of each multi-hop route is to calculate the active timing from a variety of parameters including the number of multi-hop routes, the multi-hop route number, and the active timing period. The active timing period is the time difference between one active timing and a next active timing and can be set optionally according to required specifications of an application that uses the multi-hop wireless communication network. For example, when an application that constantly monitors temperature or humidity of a specific place is employed, a period, at intervals of which sensing data of temperature or humidity is collected, is used as the active timing period and is determined by both the level of accuracy at which variation of temperature or humidity is measured and the amount of the measured data which is stored and transmitted to the wireless base station.

Figure 6:
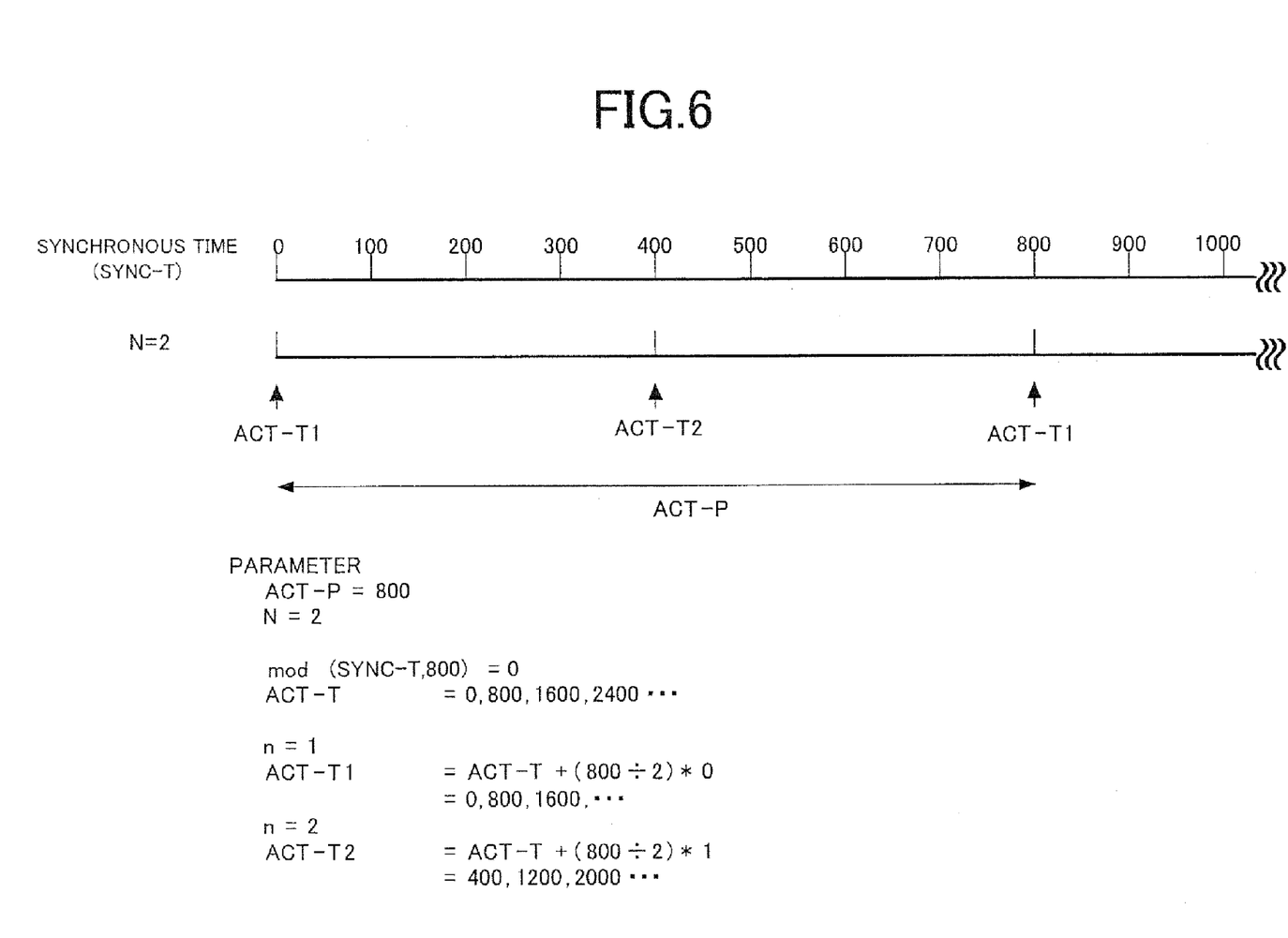
FIG. 6 is a chart illustrating a method for calculating the active timing of each multi-hop route.

FIG. 6 illustrates a method for calculating the active timing of each multi-hop route. Here, it is assumed that the number of multi-hop routes is N, the multi-hop route number is n (n=1~N), the active timing period is ACT-P, and the synchronous time is SYNC-T. Although the active timing period ACT-P is defined as a value required by the application as described above, it is desirable that the active timing period be a period divisible by the number of multi-hop routes N and that the active timing period not be fixed to an arbitrarily determined value but be variable to some extent according to the number N.

First, SYNC-T values which satisfy the following equation are determined to be ACT-T values.

mod(SYNC-$T$,ACT-$P$)=0.

That is, a series of times of SYNC-T that leave no remainder when divided by ACT-P are determined to be ACT-T. When ACT-Tn is the active timing of the multi-hop route number "n", ACT-Tn can be expressed by the following equation.

ACT-$Tn$=ACT-$T$+(ACT-$P$/$N$)*($n$−1)

The following is a detailed example with reference to FIG. 6. When the number of multi-hop routes N is 2 and the active timing period ACT-P is 800, a series of times which satisfy "mod(SYNC-T, 800)=0" are 0, 800, 1600. Accordingly, active timings ACT-T1 of the multi-hop route number "1" (i.e., n=1) are 0, 800, 1600, since ACT-T1=ACT-T+(800/2)*0. In addition, active timings ACT-T2 of the multi-hop route number "2" (i.e., n=2) are 400, 1200, 2000, since ACT-T2=ACT-T+(800/2)*1.

In the first embodiment described above, the wireless base station assigns different active timings to a plurality of multi-hoo routes to allow the multi-hop routes to be activated at different times, thereby eliminating interference between the multi-hop routes and preventing collision of transmitted wireless signals (frames). Accordingly, each wireless terminal efficiently terminates multi-hop communication and shifts early from an active state to an inactive state without wasting any waiting time, thereby achieving low power consumption.

Second Embodiment

In the second embodiment, a description will be given of how the maximum number of multi-hop routes is calculated taking into consideration both the active duration and the active timing period of wireless terminals to limit the number of multi-hop routes, thereby preventing overlapping of multi-hop routes having different active durations of wireless terminals.

Figure 7:
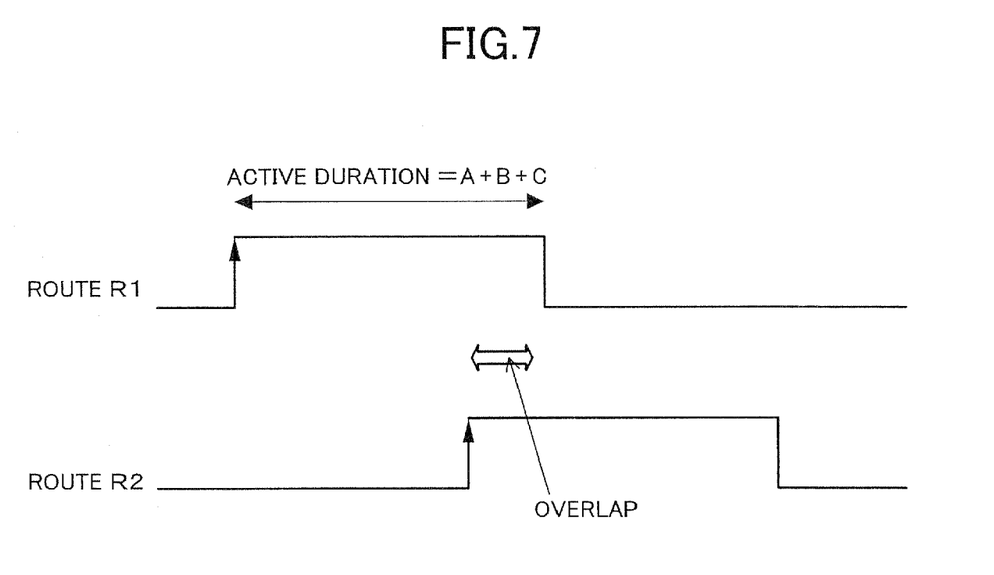
FIG. 7 is a chart illustrating overlapping of active durations of multi-hop routes.

FIG. 7 illustrates overlapping of active durations of multi-hop routes. Here, if one multi-hop route R2 is activated even though another multi-hop route R. continues an active state, the two active states may overlap, thereby causing interference between communications of the two multi-hop routes. The length of the active duration is determined by required specifications of an application running on a multi-hop wireless communication network. For example, if the application is a censor network, the required active duration is the time required until a frame required for communication arrives as a wireless signal at the wireless base station in a multi-hop fashion after sensing data is collected and the frame is created.

Figure 8:
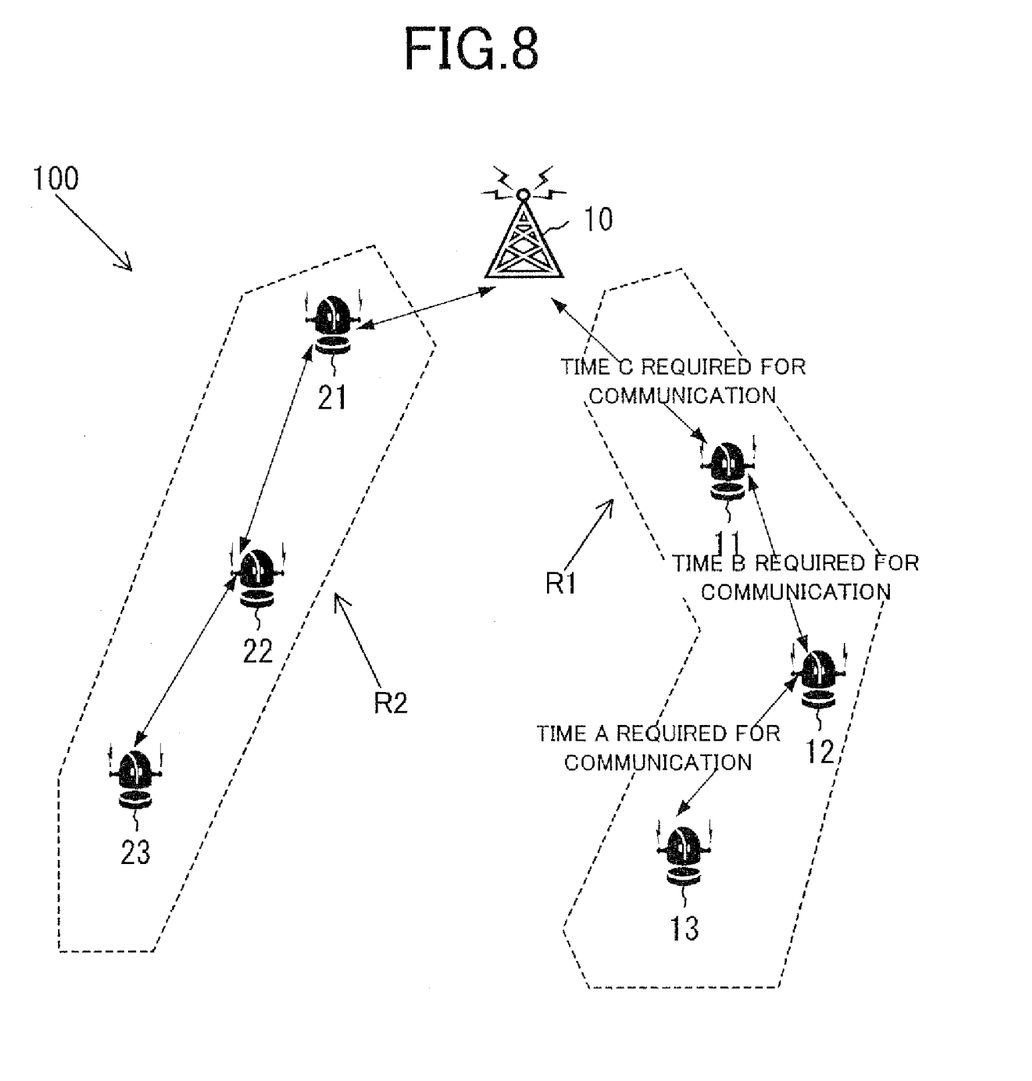
FIG. 8 is a block diagram illustrating an overall configuration of a multi-hop wireless communication system according to a second embodiment.

FIG. 8 illustrates an overall configuration of a multi-hop wireless communication system 100 according to a second embodiment. Here, it is assumed that a time required for communication between a wireless terminal 11 and a wireless terminal 12 is A, a time required for communication between the wireless terminal 12 and a wireless terminal 13 is B, and a time required for communication between the wireless terminal 13 and a wireless base station 10 is C. The time required for communication A includes a time required for the wireless terminal 13 to transmit a self-created frame as a wireless signal to the wireless terminal 12. The time required for communication B includes not only a time required for the wireless terminal 12 to transmit a self-created frame toward the wireless terminal 11 but also a time required for the wireless terminal 12 to transmit a frame received from the wireless terminal 13 toward the wireless terminal 11 in a multi-hop fashion. Similarly, the time required for communication C includes not only a time required for the wireless terminal 11 to transmit an automatically created frame toward the wireless base station 10 but also a time required for a wireless base station 10 to transmit a frame received from the wireless terminal 12 or the wireless terminal 13 toward the wireless base station 10 in a multi-hop fashion.

When the time required for communication A, the time required for communication B, and the time required for communication C are assumed as described above, the required active duration is A+B+C as shown in FIG. 7. That is, all wireless terminals belonging to one multi-hop route must return to an inactive state after the active duration elapses from the same active timing.

Figure 9:
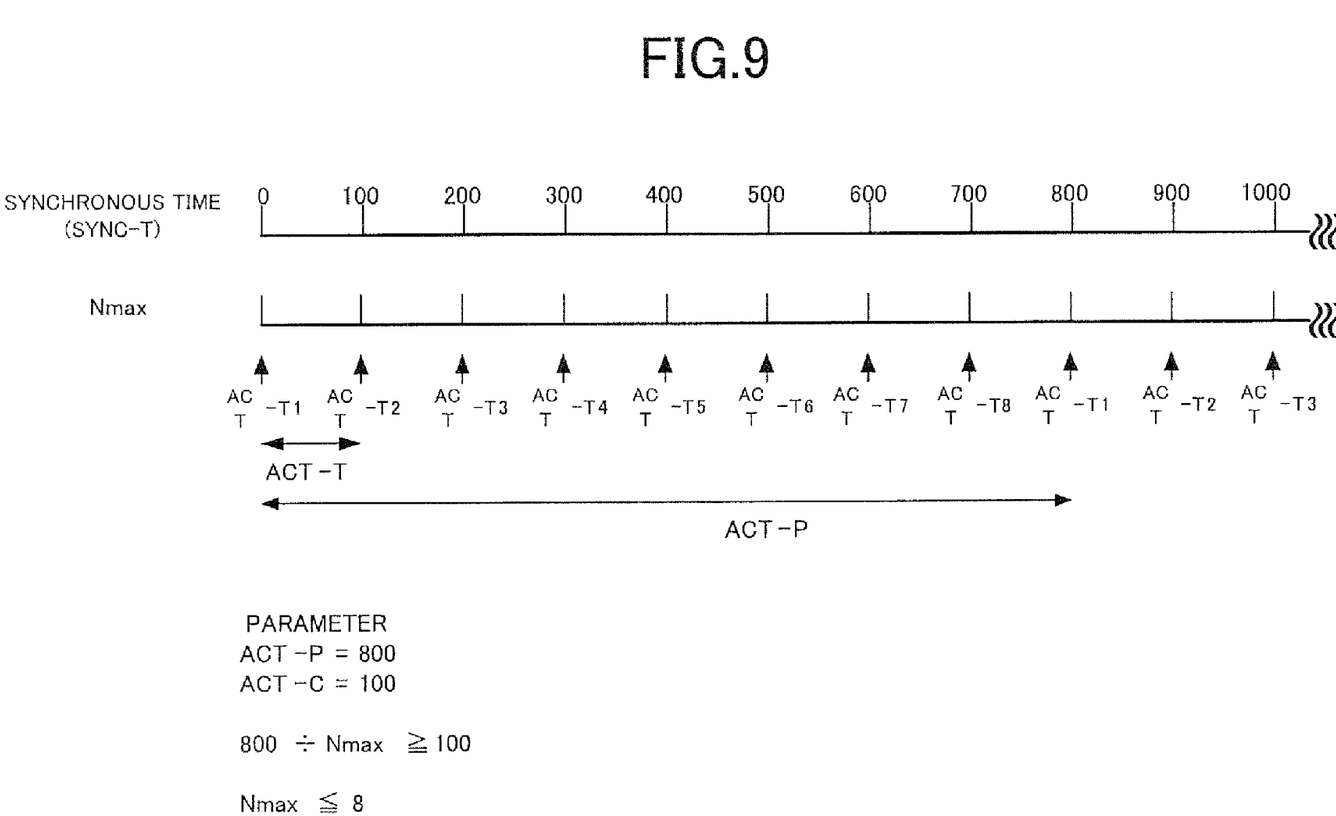
FIG. 9 is a chart illustrating a method for obtaining the maximum number of multi-hop routes.

FIG. 9 illustrates a method for obtaining the maximum number of multi-hop routes. The number of multi-hop routes is limited in the following manner in order to control the active states of the multi-hop routes so that the active states do not overlap. Here, it is assumed that the maximum number of multi-hop routes is Nmax, the active duration is ACT-C, and the active timing period is ACT-P.

(ACT-$P$)/$N$max≧(ACT-$C$)

$N$max≦(ACT-$P$)/(ACT-$C$)

If the number of multi-hop routes is limited to a value of Nmax which satisfies these inequalities, the Nmax multi-hop routes can maintain their active states for the required time and achieve satisfactory communication without causing overlapping of the active states in the active timing period.

A detailed example is described below with reference to FIG. 9. As shown in FIG. 9, the synchronous time SYNC-T starts from 0 and accrues at intervals of 100. In addition, as shown, the active duration ACT-C is 100 and an application which uses the multi-hop wireless communication network requires a total of 100 or less as the sum of a time required to collect notification information, a time required to create a frame, and a time required to perform multi-hop communication. In addition, the active timing period ACT-P is 800 and thus activation occurs at intervals of 800. Given the above conditions, the maximum number Nmax of multi-hop routes needs to satisfy 800/Nmax≧100 and thus Nmax is calculated to be 8 or less.

In the second embodiment, when different active timings are assigned to a plurality of multi-hop routes, the maximum number of multi-hop routes is calculated taking into consideration the active duration and the active timing period to limit the number of multi-hop routes. This more thoroughly eliminates interference between multi-hop routes, thereby improving communication efficiency.

In a modification of the second embodiment, two or more wireless multi-hop routes can be simultaneously activated by determining positions of wireless terminals with which the wireless base station can directly communicate. For example, multi-hop routes located opposite the base station, i.e., at an angle of 180 degrees with respect to the wireless base station, are unlikely to interfere with each other even when the multi-hop routes are simultaneously activated. Therefore, two or more wireless multi-hop routes can be simultaneously activated.

Third Embodiment

If active timings are set without taking into consideration branches extending from a multi-hop route, interference is likely to occur between communications at ends of the branches. The third embodiment suggests an operating mode in which active timings are allocated taking into consideration branching of multi-hop routes.

Figure 10:
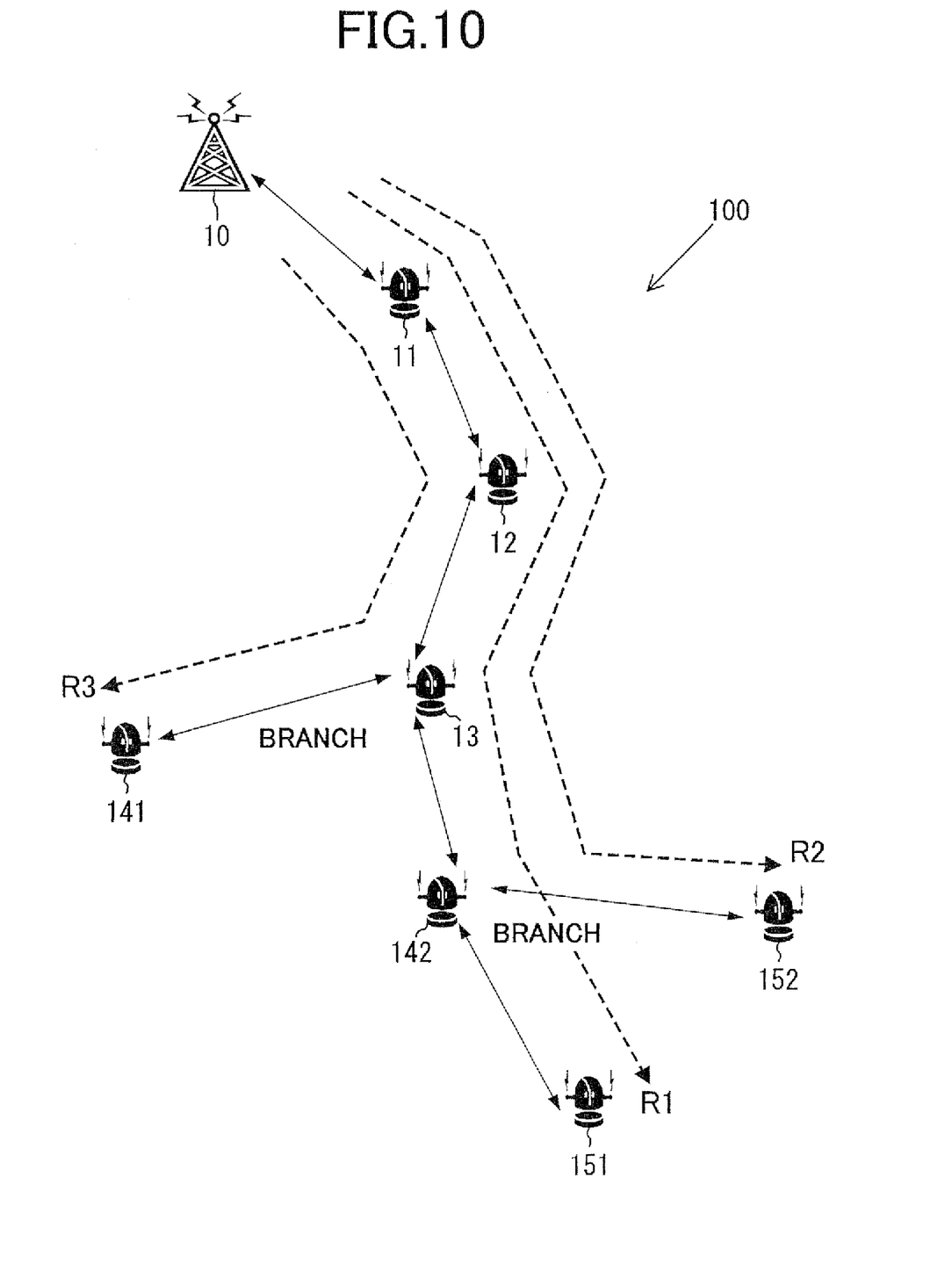
FIG. 10 is a block diagram illustrating an overall configuration of a multi-hop wireless communication system according to a third embodiment.

FIG. 10 illustrates an overall configuration of a multi-hop wireless communication system 100 according to the third embodiment. Here, one multi-hop route including a wireless base station 10 and wireless terminals 11, 12, and 13 is formed and is branched into two routes including a wireless terminal 141 and a wireless terminal 142, respectively, ahead of the wireless terminal 13. In addition, the route including the wireless terminal 142 is branched into two routes including a wireless terminal 151 and a wireless terminal 152, respectively, ahead of the wireless terminal 142. In this case, three routes, i.e., the route including the wireless terminal 141, the route including the wireless terminal 142 and the wireless terminal 151, and the route including the wireless terminal 142 and the wireless terminal 152, are formed ahead of the wireless terminal 13.

If the first embodiment or the second embodiment is applied without taking into consideration such branches, it is expected that the active times of the ends of the branches overlap, increasing the possibility that interference occurs between communications of the ends of the branches, thereby reducing the effects of the first or second embodiment.

In the above operation mode, actually, it can be considered that three multi-hop routes R1, R2, and R3 are present. That is, the multi-hop route R1 is formed along the wireless base station 10 and the wireless terminals 11, 12, 13, 142, and 151. The multi-hop route R2 is formed along the wireless base station 10 and the wireless terminals 11, 12, 13, 142, and 152. The multi-hop route R3 is formed along the wireless base station 10 and the wireless terminals 11, 12, 13, and 141.

Figure 12:
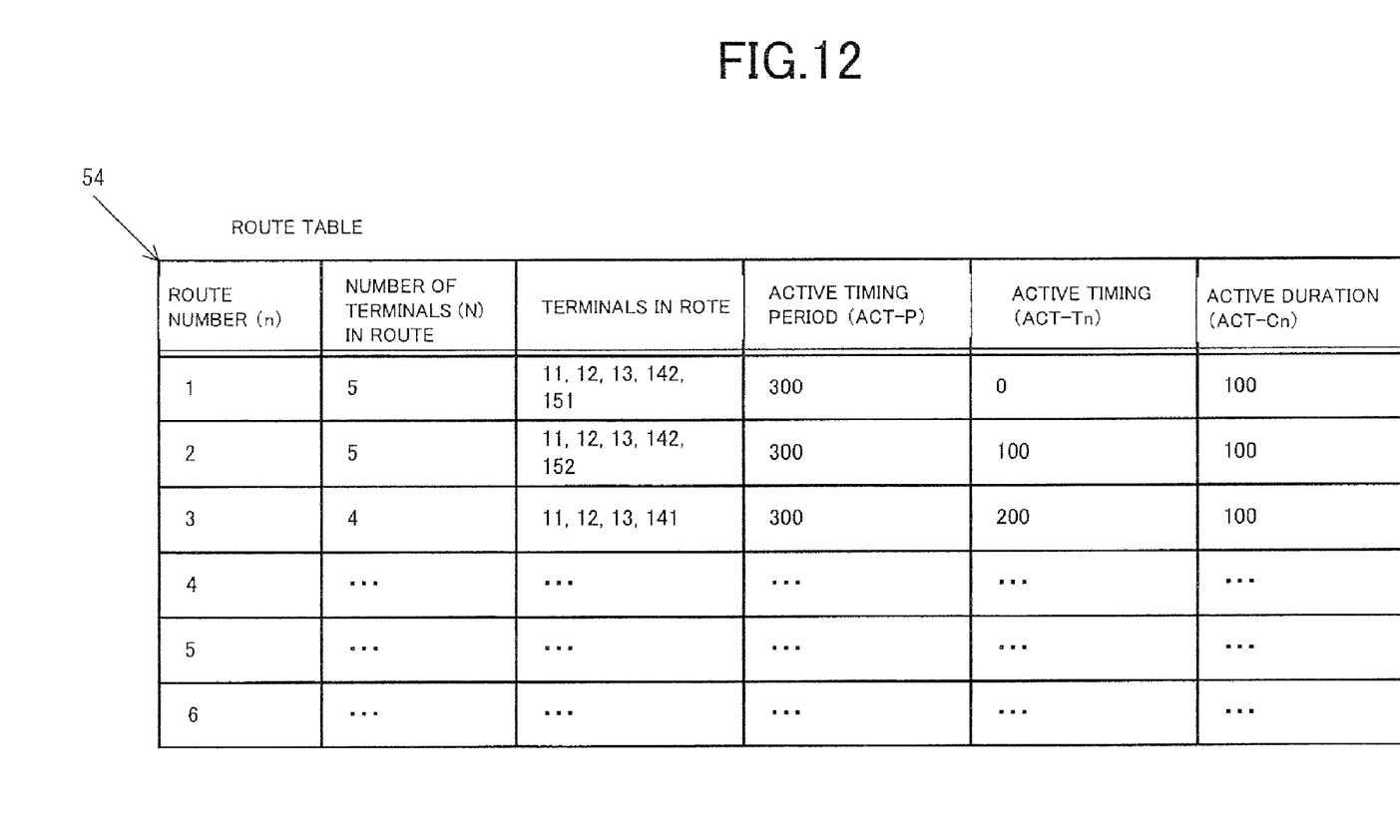
FIG. 12 is a diagram illustrating an example configuration of a route table in the third embodiment.

Therefore, in the third embodiment, when the wireless terminal 11 enters the multi-hop wireless communication system as a new wireless terminal or the wireless terminal 141, the wireless terminal 142, the wireless terminal 151, and the wireless terminal 152 enter the multi-hop wireless communication system as new wireless terminals, the wireless base station 10 detects that branches of multi-hop routes are formed and sets the multi-hop routes in a route table 54 based on the detection, as shown in FIG. 12.

Means for informing the wireless base station 10 of presence of a branch ahead of a multi-hop route may include, for example, a method in which a wireless terminal corresponding to a beginning of the branch incorporates branch information into a frame and sends the frame to the wireless base station 10 to notify the wireless base station 10 of the branch. Means for the wireless base station 10 to notify a wireless terminal corresponding to an end of a branch of an active timing may include a method in which the wireless base station 10 notifies wireless terminals including up to a wireless terminal defining the branch point of the active timing, as in the first or second embodiment, and the wireless terminal defining the branch point further transmits information of the active timing to a wireless terminal corresponding to the end of the branch.

Figure 11:
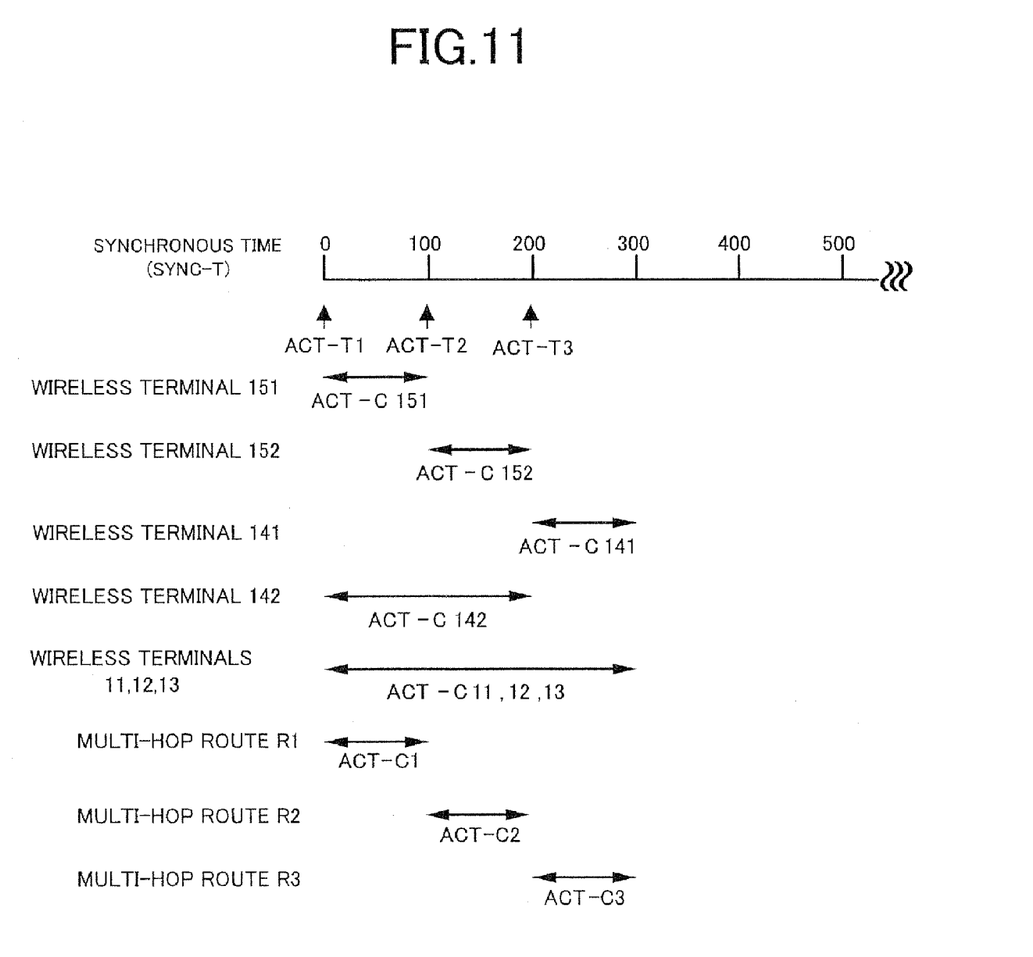
FIG. 11 is a chart illustrating a method for calculating an active timing of each multi-hop route.

FIG. 11 illustrates a method for calculating an active timing of each multi-hop route. Here, as shown in FIG. 11, the synchronous time SYNC-T starts from 0 and accrues at intervals of 100. The active duration ACT-C is 100 and an application which uses the multi-hop wireless communication network requires a total of 100 or less as the sum of a time required to collect notification information, a time required to create a frame, and a time required to perform multi-hop communication.

The active durations of the wireless terminals 11, 12, and 13 are ACT-C11, ACT-C12, and ACT-C13, respectively, and the active duration of the wireless terminal 142 is ACT-C142, and active durations of the wireless terminals 141, 151, and 152 are ACT-C141, ACT-C151, and ACT-C152, respectively. The active timings of the wireless terminals are ACT-T1, ACT-T2, and ACT-T3. That is, the active timing ACT-T1 is assigned to the multi-hop route R1, the active timing ACT-T2 is assigned to the multi-hop route R2, and the active timing ACT-T3 is assigned to the multi-hop route R3.

Here, the wireless terminals 11, 12, and 13 commonly belong to all multi-hop routes and thus need to be kept active for a time of 100 after each of the active timings ACT-T1, ACT-T2, and ACT-T3, i.e., need to be kept active for a total time of 300. In addition, since the wireless terminal 142 commonly belongs to the multi-hop routes R1 and R2, the wireless terminal 142 needs to be kept active for a time of 100 after each of the active timings ACT-T1 and ACT-T2, i.e., needs to be kept active for a total time of 200. Further, the wireless terminal 151 needs to be kept active for a time of 100 after the active timing ACT-T1, the wireless terminal 152 needs to be kept active for a time of 100 after the active timing ACT-T2, and the wireless terminal 141 needs to be kept active for a time of 100 after the active timing ACT-T3.

In the third embodiment, since each multi-hop route having a branch is additionally assigned an active timing corresponding to the branch, it is possible to prevent interference between communications of routes including the end of the branch and to prevent collision of transmitted frames, thereby increasing communication efficiency. In addition, wireless terminals corresponding to the beginning and end of the branch efficiently terminate multi-hop communication and thus shift early from an active state to an inactive state, thereby achieving low power consumption.

Although the above description has been given with reference to three consecutive active timings, i.e., ACT-T1, ACT-T2, and ACT-T3, the active timings need not to be consecutive in the embodiments of the invention and a wireless terminal may shift from an active state to an inactive state at one active timing and another active timing may be allocated when a specific time has elapsed thereafter.

As is apparent from the above embodiments described above, the invention has a feature that a wireless base station in a multi-hop wireless communication network controls, for each multi-hop route, the timing of change of state of each wireless terminal of the multi-hop route from an inactive state to an active state. This feature prevents concentration of communication at the same time and reduces collision or a waiting time for communication, thereby reducing power consumption of wireless terminals and achieving efficient communication.

The multi-hop wireless communication system according to the invention can be applied not only to a data network of sensors that measure temperature or humidity but also to a variety of multi-hop wireless communication systems in which data obtained at each wireless terminal is transmitted to a wireless base station in a multi-hop fashion.

This application is based on a Japanese Patent Application No. 2008-019264 which is hereby incorporated by reference.

What is claimed is:

1. A multi-hop wireless communication system including a wireless base station and a plurality of wireless terminals, each of the wireless terminals performing wireless communication through a multi-hop route formed directly or through at least one other wireless terminal with the wireless base station, the multi-hop wireless communication system comprising:
    a time signal synchronizer which synchronizes a time signal generated by a timer device included in each of the wireless terminals; and
    an active timing setting unit which sets a different active timing for each multi-hop route to wireless terminals located on each multi-hop route,
    wherein each of the wireless terminals monitors the time signal of the timer device included in the wireless terminal and activates wireless communication of the wireless terminal when it is detected that the time signal matches an active timing set in the wireless terminal, and
    wherein assuming that the number of multi-hop routes is N, a multi-hop route number is n (n=1~N), and an active timing period is ACT-P, the active timing ACT-Tn of the multi-hop route number n is expressed by the following equation:

$$\text{ACT-}Tn = \text{ACT-}T + (\text{ACT-}P/N)*(n-1).$$

2. The multi-hop wireless communication system according to claim 1, wherein the active timing setting unit sets an active duration together with the active timing and the wireless terminal continues the active state of the wireless communication during an active duration set in the wireless terminal.

3. The multi-hop wireless communication system according to claim 2, wherein assuming that the maximum number of multi-hop routes is Nmax, the active duration is ACT-C, and the active timing period is ACT-P, the maximum number Nmax is expressed by the following equation:

$$N\text{max} \leq \text{ACT-}P/(\text{ACT-}C).$$

4. The multi-hop wireless communication system according to claim 1, wherein each multi-hop routes is branched from the wireless base station as a branch point.

5. The multi-hop wireless communication system according to claim 1, wherein at least two multi-hop routes include a common route formed from the wireless base station to a branch-point wireless terminal and are branched from the branch-point wireless terminal as a branch point.

6. The multi-hop wireless communication system according to claim 1, wherein the time signal synchronizer synchronizes the time signal of the timer device included in each of the wireless terminals with a time signal generated by a synchronous timer in the wireless base station.

7. A wireless communication method in a multi-hop wireless communication system including a wireless base station and a plurality of wireless terminals, each of the wireless terminals performing wireless communication through a multi-hop route formed directly or through at least one other wireless terminal with the wireless base station, the wireless communication system comprising the steps of:
    synchronizing a time signal generated by a timer device included in each of the wireless terminals; and setting a different active timing for each multi-hop route to wireless terminals located on each multi-hop route;
    monitoring the time signal of the timer device in each of the wireless terminals; and
    activating wireless communication of the wireless terminal when it is detected that the time signal matches an active timing set in each of the wireless terminal,
    wherein assuming that the number of multi-hop routes is N, a multi-hop route number is n (n=1~N), and an active timing period is ACT-P, the active timing ACT-Tn of the multi-hop route number n is expressed by the following equation:

$$\text{ACT-}Tn = \text{ACT-}T + (\text{ACT-}P/N)*(n-1).$$

* * * * *